(12) United States Patent
Kung et al.

(10) Patent No.: US 9,032,075 B2
(45) Date of Patent: May 12, 2015

(54) SYSTEMS AND METHODS FOR MEDIUM ACCESS CONTROL

(71) Applicant: President and Fellows of Harvard College, Cambridge, MA (US)

(72) Inventors: Hsiang-Tsung Kung, Belmont, MA (US); Tsung-Han Lin, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 13/649,854

(22) Filed: Oct. 11, 2012

(65) Prior Publication Data
US 2014/0025818 A1 Jan. 23, 2014

Related U.S. Application Data

(60) Provisional application No. 61/546,286, filed on Oct. 12, 2011.

(51) Int. Cl.
G06F 15/173 (2006.01)
H04L 12/24 (2006.01)
H04L 12/40 (2006.01)

(52) U.S. Cl.
CPC .......... *H04L 41/00* (2013.01); *H04L 12/40013* (2013.01)

(58) Field of Classification Search
None
See application file for complete search history.

(56) References Cited

U.S. PATENT DOCUMENTS

| 7,555,267 | B2* | 6/2009 | Wong et al. | 455/66.1 |
|---|---|---|---|---|
| 7,778,170 | B2* | 8/2010 | Aboba et al. | 370/230 |
| 2003/0198244 | A1* | 10/2003 | Ho et al. | 370/442 |
| 2003/0216156 | A1* | 11/2003 | Chun | 455/562.1 |
| 2007/0058605 | A1* | 3/2007 | Meylan et al. | 370/346 |
| 2008/0049718 | A1* | 2/2008 | Chindapol et al. | 370/351 |
| 2008/0095121 | A1* | 4/2008 | Shattil | 370/335 |
| 2010/0074243 | A1* | 3/2010 | Yonge et al. | 370/343 |
| 2010/0104036 | A1* | 4/2010 | Liao et al. | 375/260 |
| 2010/0241747 | A1* | 9/2010 | Guo et al. | 709/225 |
| 2011/0149881 | A1* | 6/2011 | Gong et al. | 370/329 |
| 2012/0288003 | A1* | 11/2012 | Do et al. | 375/240.16 |
| 2014/0286582 | A1* | 9/2014 | Oka et al. | 382/232 |

OTHER PUBLICATIONS

Berinde et al., "Combining geometry and combinatorics: a unified approach to sparse signal recovery" *Allerton* (2008).
Bharghavan et al., "MACAW: A media access protocol for wireless LAN's" *SIGCOMM* pp. 212-225 (1994).
Candès, "Compressive Sampling" *Proc Int'l Congress Math*, pp. 1433-1452 (2006).

(Continued)

*Primary Examiner* — Melvin H Pollack
*Assistant Examiner* — Oluwatosin Gidado
(74) *Attorney, Agent, or Firm* — Wolf, Greenfield & Sacks, P.C.

(57) ABSTRACT

Techniques for medium access control. Some techniques include receiving, at a first computing device, a solicitation for at least a first medium access request that specifies at least one time period for transmitting the first medium access request to the second computing device; encoding the first medium access request at least in part by using a compressive sensing encoding technique to obtain a first encoded medium access request; and transmitting the first encoded medium access request to the second computing device during the at least one time period specified in the received solicitation.

17 Claims, 5 Drawing Sheets

(56) References Cited

OTHER PUBLICATIONS

Davenport et al., "Introduction to compressed sensing" *Electrical Engineering* pp. 1-68 (2011).

Heusse et al., "Idle Sense: An optimal access method for high throughput and fairness in rate diverse wireless LANs" *SIGCOMM*, pp. 121-132 (Aug. 22-26, 2005).

Indyk et al., "Near-optimal sparse recovery in the $L_1$ norm" pp. 199-207 *Allerton* (2008).

Jian et al., "Can CSMA/CA networks be made fair" *MobiCom* pp. 235-246 (2008).

Koksal et al., "An analysis of short-term fairness in wireless media access protocols" *SIGMETRICS* pp. 118-119 (2000).

Sharon et al., "An efficient polling MAC for wireless LANs" *IEEE ACM Trans Network* vol. 9, No. 4, pp. 439-451 (Aug. 4, 2001).

Tan et al., "Fine-grained channel access in wireless LAN" *SIGCOMM* vol. 21, No. 3, pp. 772-787 (Jun. 2013).

Xue et al., "Proportional service differentiation in wireless LANs using spacing-based channel occupancy regulation" *MM* vol. 11, pp. 229-240 (2006).

\* cited by examiner

SYSTEMS AND METHODS FOR MEDIUM ACCESS CONTROL

CROSS-REFERENCE TO RELATED APPLICATIONS

The present application claims the benefit under 35 U.S.C. §119(e) of U.S. Provisional Application Ser. No. 61/546,286, filed on Oct. 12, 2011, titled, "Medium Access Control," which is hereby incorporated by reference in its entirety.

FEDERALLY SPONSORED RESEARCH

This invention was made with government support under FA8750-10-2-0180 awarded by the Air Force Research Laboratory. The government has certain rights in the invention.

BACKGROUND

In many networking environments, multiple devices share a physical communication medium for transmitting data. For example, in some wireless networking environments (e.g., wireless local area networks implemented in accordance with one of the IEEE 802.11 standards) multiple devices share a fixed number of channels for transmitting data to one or more access points. As another example, in some wired networking environments (e.g., wired local area networks implemented in accordance with one of the IEEE 802.3 Ethernet standards), multiple devices share common wired links to transmit data.

Medium access control (MAC) techniques are used to regulate how devices in a networking environment access the physical communication medium they share. MAC techniques can be used to help reduce or eliminate collisions that result from multiple devices concurrently transmitting data over a shared physical communication medium.

Some conventional medium access control techniques are implemented using a distributed control scheme and, as such, are herein referred to as distributed MAC techniques. In one illustrative distributed MAC technique, when a device, sharing a physical communication medium with other devices, has data to transmit, the device attempts to transmit the data. If the device fails to successfully transmit the data (e.g., due to collisions with data transmitted by one or more other devices), the device can repeatedly attempt to re-transmit the data after waiting for successively increasing time periods. Waiting to transmit data for successively increasing time periods is sometimes referred to as a "back-off" scheme.

Some other conventional medium access control techniques are implemented using a centralized control scheme and, as such, are herein referred to as centralized MAC techniques. In one illustrative centralized control scheme, a controller device can poll multiple devices one at a time (e.g., in a round-robin fashion) to determine which of the polled devices have data to transmit. After determining which devices have data to transmit, the controller device can create a conflict-free transmission schedule, in which one device at a time transmits data, and provide the transmission schedule to the devices. In turn, the devices can transmit data in accordance with the transmission schedule.

SUMMARY

Some embodiments of the present disclosure provide a method performed by a first computing device configured to communicate with a second computing device. The method comprises (A) receiving a solicitation for at least a first medium access request that specifies at least one time period for transmitting the first medium access request to the second computing device; (B) encoding the first medium access request at least in part by using a compressive sensing encoding technique to obtain a first encoded medium access request; and (C) transmitting the first encoded medium access request to the second computing device during the at least one time period specified in the received solicitation.

Other embodiments of the present disclosure provide a method for medium access control performed by a controller device configured to communicate with a plurality of computing devices. The method comprises (A) receiving a medium access request signal formed at least in part by a superposition of a plurality of encoded medium access requests transmitted by a subset of the plurality of computing devices; and (B) decoding the medium access request signal at least in part by using a compressive sensing decoding technique to obtain a plurality of decoded medium access requests.

Still other embodiments of the present disclosure provide a controller device configured to communicate with a plurality of computing devices, the controller device comprising at least one processor configured to perform: (A) receiving a medium access request signal formed at least in part by a superposition of a plurality of encoded medium access requests transmitted by a subset of the plurality of computing devices; and (B) decoding the medium access request signal at least in part by using a compressive sensing decoding technique to obtain a plurality of decoded medium access requests.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
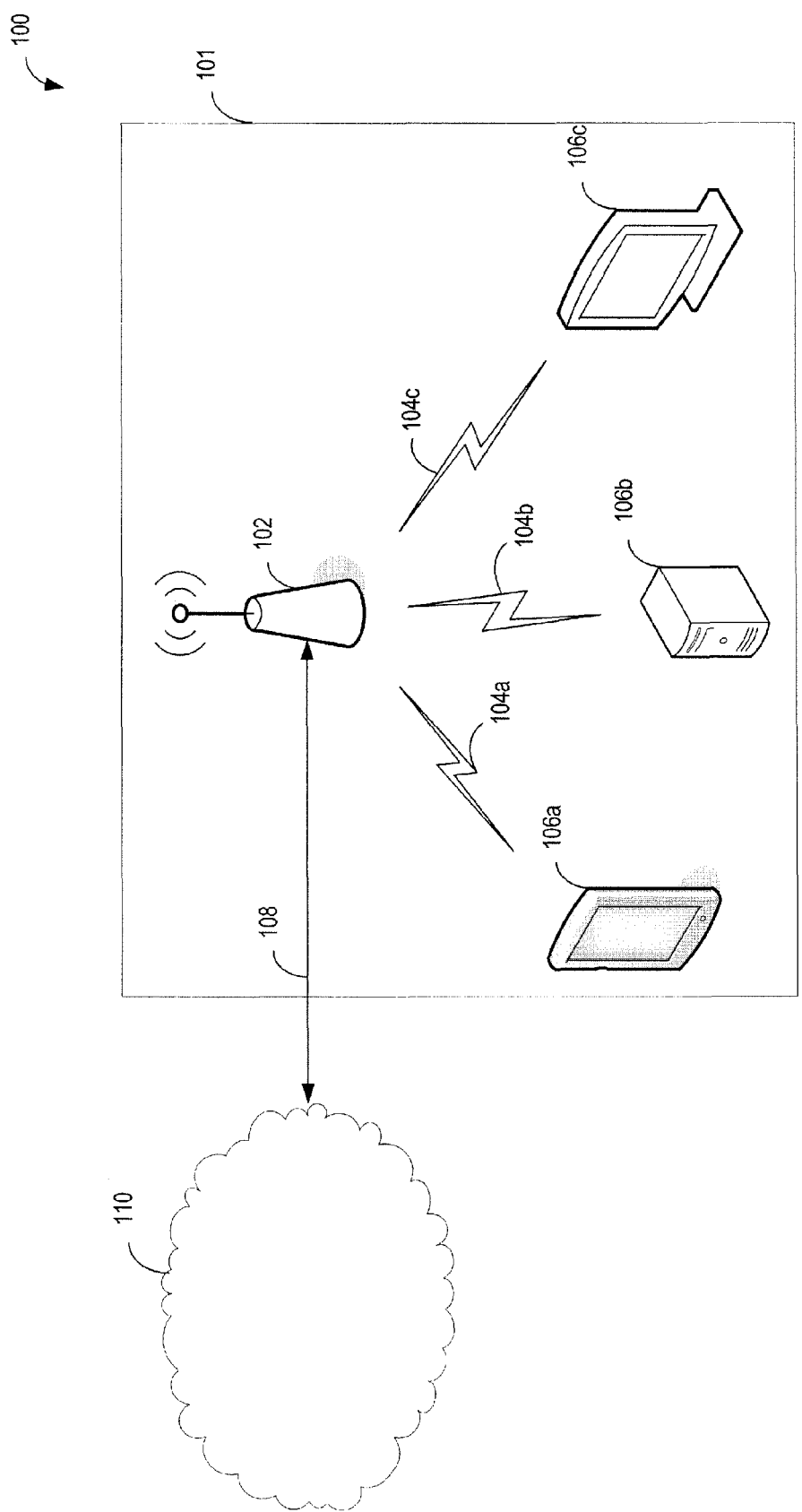
FIG. 1 shows an illustrative environment in which some embodiments may operate.

The inventors have appreciated that a number of problems arise when using conventional distributed MAC techniques. For example, when each of multiple devices (e.g., wireless stations) sharing a physical communication medium attempts to communicate with another device (e.g., a wireless access point) collisions may arise because none of these devices has information about when other devices are transmitting data. This "hidden terminal problem" occurs because information about when devices transmit data is not available to other devices sharing the same communication medium. The resulting collisions lead to an undesirable drop in throughput of data. As another example, the above-described back-off scheme used in distributed MAC techniques may lead to one device transmitting data over the medium for a disproportionate amount of time relative to other devices.

The inventors have recognized that although some conventional centralized MAC techniques may address the above-described problems of conventional distributed MAC techniques, conventional centralized MAC techniques are also problematic because they use a significant amount of time to coordinate how devices access the medium they share, thereby increasing the overall time required to transmit data. For example, in centralized MAC techniques that make use of one-at-a-time polling, as previously described, it takes a significant amount of time to construct a conflict-free transmission schedule because a controller device needs to sequentially communicate with each of the devices sharing a physical communication medium in order to do so.

In other conventional centralized MAC techniques, instead of polling devices in a one-at-a-time fashion, a controller device may send a solicitation for medium access requests to the devices. In response to receiving the solicitation, each device that has data to transmit sends a request to the controller device for access to the medium. Based on the received medium access requests, the controller device creates a conflict-free transmission schedule, in which devices transmit data one at a time, and provide the created transmission schedule to the devices, which in turn can transmit data in accordance with the schedule. Under this centralized MAC scheme, collisions frequently arise when multiple devices concurrently transmit medium access requests to the controller device responsive to receiving a solicitation. In response to a failed transmission of a medium access request, a device performs a back-off scheme by repeatedly attempting to re-transmit the medium access request after each of one or more successively increasing time periods. Collisions that result from concurrent transmission of access requests delay when the controller device can create a transmission schedule, thereby increasing the overall amount of time needed for the devices sharing the medium to transmit data over the medium.

Some embodiments described herein address all of the above-described issues that the inventors have recognized with conventional medium access control techniques. However, not every embodiment described below addresses every one of these issues, and some embodiments may not address any of them. As such, it should be appreciated that embodiments of the disclosure provided herein are not limited to addressing all or any of the above-discussed issues of conventional medium access control techniques.

The inventors have recognized that centralized MAC techniques may be improved if multiple devices were able to transmit access requests, concurrently, to a controller device. Concurrently transmitting access requests to a controller device may reduce the amount of time needed to coordinate when each of the devices may transmit data using the shared communication medium. As one non-limiting example, if instead of each of N devices (where N is any integer greater than 1) sequentially transmitting an access request, all N devices were to transmit the respective access requests concurrently, the amount of time needed to transmit all the access requests may be reduced by up to a factor of N.

Accordingly, some embodiments provide for centralized MAC techniques that reduce the amount of time needed to coordinate when each of multiple devices sharing a physical communication medium may use the medium for transmitting data, receiving data, and/or any other suitable purpose. Some embodiments provide for centralized MAC techniques that allow multiple devices to simultaneously transmit information to one or more controller devices such that the controller device(s) may receive and appropriately process the transmitted information. This may be done in any suitable way and, in some embodiments, may be done by using one or more compressive sensing techniques. Any MAC technique that makes use of one or more compressive sensing techniques is herein referred to as a compressive sensing medium access control (CS-MAC) technique.

In some embodiments, in response to receiving a solicitation for medium access requests from a controller device, each of one or more devices may encode a medium access request using a compressive sensing encoding technique. The devices may then concurrently transmit the respective encoded medium access requests to the controller device. The controller device may receive a medium access request signal formed from the transmitted encoded medium access requests and decode the medium access request signal by using a compressive sensing decoding technique. The controller device may then determine, based at least in part on the decoded medium access requests, a schedule for when each of the devices requesting medium access may transmit data via the medium and may communicate the schedule to the devices. In turn, the devices may transmit data in accordance with the received schedule.

As one non-limiting example, in a wireless networking environment (e.g., a wireless local area network implemented in accordance with one of the IEEE 802.11 standards), an access point may transmit a solicitation for medium access requests to multiple stations configured to communicate wirelessly with the access point. Responsive to receiving the solicitation for medium access requests, each station may encode a medium access request using a compressive sensing encoding technique and transmit the encoded access request to the access point. The access point may receive a medium access request signal formed by superposition of the transmitted encoded medium access requests. The access point may decode the medium access request signal via a compressive sensing decode technique and use the decoded request to determine when each of the stations may transmit data to the access point and transmit this information to the stations, which in turn may transmit information to the access point in accordance with this information. Though, it should be appreciated that the above example is illustrative as aspects of the disclosure provided herein are not limited to being applied in a wireless networking environment and may be applied in any other suitable networking environment.

In some embodiments, a device (e.g., a station in a wireless networking environment) may encode a medium access request using a compressive sensing encoding technique at least in part by using random weights. For example, a medium access request may be encoded by multiplying bits in the request by the random weights. In some embodiments, the weights may be obtained by using at least on probability distribution such as a probability distribution of a Gaussian random variable, a Bernoulli random variable, and/or any other suitable type of random variable, as aspects of the disclosure provided herein are not limited in this respect.

In some embodiments, a controller device (e.g., an access point in a wireless networking environment) may decode a medium access request signal by using a compressive sensing decoding technique at least in part by using the random weights used to encode the medium access requests.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as the application is not limited in this respect.

Some embodiments of the disclosure provided herein may operate in the illustrative environment 100 shown in FIG. 1. Illustrative environment 100 comprises a wireless network 101 connected via wired link 108 to network 110. Network 110 may be any suitable type of network (e.g., Internet, a corporate Intranet, or any other suitable type of network) used to connect one or more devices in the wireless network 101 to one or more devices external to the wireless network 101. In the wireless network 101, controller device 102 is configured to communicate with computing devices 106a, 106b, and 106c via a shared physical communication medium. For example, controller device 102 is configured to communicate with computing devices 106a, 106b, and 106c wirelessly via wireless links 104a, 104b, and 104c, respectively.

Even though illustrative environment 100 comprises wireless network 101, embodiments of the disclosure provided herein are not limited to operating in a wireless network. For example, some embodiments of the disclosure provided herein may operate in a wired network in which devices communicate via wired links (e.g., a wired local area network, a wired wide area network, an Ethernet network, etc.) or a mixed network comprising both wired and wireless links. Accordingly, some embodiments of the disclosure provided herein may operate in a networking environment different from illustrative environment 100 (e.g., an environment comprising a wired network and/or a mixed network instead of or in addition to a wireless network).

Wireless network 101 may be any suitable type of wireless network. For example, wireless network 101 may be a wireless local area network (WLAN), a wireless metropolitan area network (WMAN), a wireless mesh network, a wireless personal area network, or any other suitable type of wireless network.

Wireless network 101 may be implemented in accordance with any suitable type of wireless networking protocol or protocols. For example, wireless network 101 may be implemented in accordance with one or more of the IEEE 802.11 (Wi-Fi) standards for wireless local area networks. Wireless network 101 may allow for communication among devices in the network over a predetermined number of channels. As another example, wireless network 101 may be implemented in accordance with one or more of the IEEE 802.16 standards (WiMAX). Other examples are well known.

In some embodiments, controller device 102 may be configured to operate as an access point configured to support communications among computing devices in wireless network 101 and one or more other computing devices external to wireless network 101. For example, a computing device in wireless network 101 (e.g., computing device 106a, 106b, or 106c) may transmit/receive data to/from one or more computing devices external to wireless network 101 by transmitting/receiving the data to/from controller device 102. In turn, controller device 102 may transmit/receive the data to/from the computing devices external to wireless network 101.

Wireless network 101 may comprise any suitable type of computing device capable of wireless communication. Wireless network 101 may comprise one or more portable computing devices (e.g., one or more: mobile phones, smart phones, personal digital assistants, tablet computers, media reproduction devices, laptops, etc.). Additionally or alternatively, wireless network 101 may comprise one or more fixed portable computing devices (e.g., one or more: desktops, personal computers, servers, appliances, etc.).

Wireless network 101 may comprise any suitable number of computing devices. Though only a single controller device and three computing devices are shown in wireless network 101, this is merely for illustrative purposes, as aspects of the disclosure provided herein are not limited in this respect. For example, in some embodiments, wireless network 101 may comprise multiple controller devices (e.g., multiple access points). As another example, in some embodiments, wireless network 101 may comprise at least two computing devices, at least five computing devices, at least ten computing devices, at least twenty-five computing devices, at least fifty computing devices, at least one hundred computing devices, at least two hundred and fifty computing devices, at least five hundred, or at least one thousand computing devices.

One or more medium access control techniques may be used to regulate how multiple devices in wireless network 101 access the physical communication medium they share. For example, one or multiple MAC techniques may be used to regulate how multiple computing devices in a wireless local area network implemented in accordance with one or more of the IEEE 802.11 protocols share wireless channels to communicate with one another and/or one or more access points. In the networking environment illustrated in FIG. 1, one or multiple MAC techniques may be used to regulate how computing devices 106a, 106b, and 106c share wireless channels to communicate with controller device 102.

In some embodiments, a compressive sensing MAC technique may be used to regulate how multiple devices in wireless network 101 access and/or use the physical communication medium they share. In some embodiments, a compressive sensing MAC technique may be used together with one or more other MAC techniques, as aspects of the disclosure provided herein are not limited to employing only a compressive sensing MAC technique to regulate how multiple devices access and/or use the communication medium they share. For example, in some embodiments, a compressive sensing MAC technique may be used together with a carrier sense multiple access (CSMA) technique (e.g., a CSMA collision avoidance technique, a CSMA collision detection technique, a virtual time CSMA technique, etc.), an 802.11 distributed coordination function (DCF) technique, an 802.11 point coordination function (PCF) technique, an 802.11 hybrid coordination function (HCF) technique, and/or any other suitable distributed or centrally coordinated MAC technique. As a specific non-limiting example, the manner in which some computing devices in a wireless local area network access and/or use wireless channels may be regulated by a CS-MAC technique, and the manner in which some other computing devices in the same wireless LAN access and/or use wireless channels may be regulated by the 802.11 DCF, 802.11 PCF, or 802.11 HCF technique.

A medium access control technique for regulating how devices access and/or use a communication medium may be implemented in any of a variety of ways. For example, in some embodiments, some or all of the devices sharing the communication medium may execute one or more software modules comprising processor executable instructions and parameters that, when executed, cause the devices to access and/or use the communication medium they share in accordance with a medium access control technique. Though, in some embodiments, may be implemented in hardware or by using any suitable combination of software and hardware, a medium access control technique is not limited to being implemented only in software.

In some embodiments, different types of devices sharing a communication medium may implement different aspects of a medium access control technique or techniques. For example, to implement a centrally-coordinated MAC technique, a controller device configured to coordinate access to the communication medium among multiple computing devices may perform one or more functions to implement the centralized MAC technique that are not performed by the computing devices. For example, as described in more detail below with reference to FIG. 4, a controller device may be configured to coordinate access to the communication medium by performing acts including, but not limited to, transmitting a solicitation for medium access requests to computing devices, receiving encoded medium access requests, decoding the received medium access requests, and creating a schedule according to which computing devices are to transmit data via the medium.

Figure 2A:
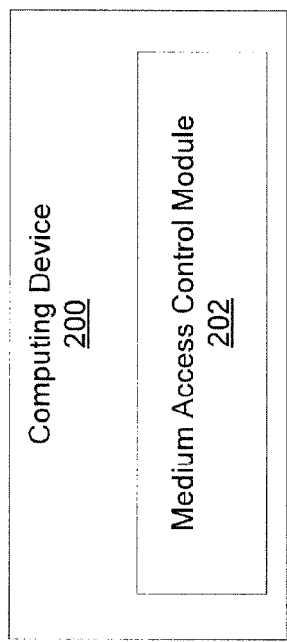
FIG. 2A is a block diagram of some software components of an illustrative computing device used to implement aspects of a medium access control technique, in accordance with some embodiments.
Figure 2B:
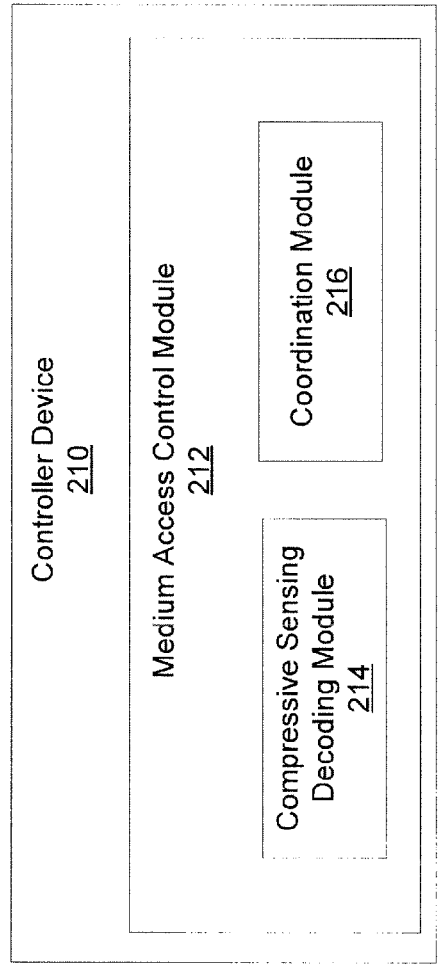
FIG. 2B is a block diagram of some software components of an illustrative controller device, which is configured to communicate with a plurality of computing devices sharing a physical communication medium, used to implement aspects of a medium access control technique, in accordance with some embodiments.

As illustrated in FIGS. 2A and 2B, different types of devices sharing a communication medium may implement different aspects of a medium access control technique or techniques by using one or more different software modules. FIG. 2A shows that an illustrative computing device 200 (examples of which have been described) may implement at least a portion of MAC functionality via MAC module 202. MAC module 202 may comprise instructions that, when executed by computing device 200, cause the computing device to implement aspects of one or more medium access control techniques. For example, in some embodiments, MAC module 202 may comprise instructions that, when executed by the computing device, cause the computing device to perform acts to implement aspects of a compressive sensing MAC technique including, but not limited to, generating, encoding, and transmitting medium access requests to a controller device. These and other acts, which may be performed by MAC module 202, are described in greater detail below with reference to FIG. 3.

FIG. 2B shows that an illustrative controller device 210 (e.g., controller device 102) may implement at least a portion of MAC functionality via MAC module 212. MAC module 212 may comprise instructions that, when executed by controller device 210, cause the controller device to implement aspects of one or more medium access control techniques. For example, in some embodiments, MAC module 212 may comprise processor-executable instructions that, when executed by the controller device, cause the controller device to perform acts to implement aspects of a compressive sensing MAC technique and/or one or more other MAC techniques examples of which have been described. For example, as illustrated in FIG. 2B, MAC module 212 comprises coordination module 216 that comprises processor-executable instructions that, when executed by the controller device, cause the controller device to perform acts including, but not limited to, soliciting medium access requests from multiple computing devices, receiving encoded medium access requests, decoding the received medium access requests, and determining when each of multiple devices requesting medium access may access the medium. MAC module also comprises compressive sensing decoding module 214 that comprises processor-executable instructions that, when executed by the controller device, cause the controller device to perform a compressive sensing decoding technique. These and other acts, which may be performed by MAC module 212, are described in greater detail below with reference to FIG. 4.

Figure 3:
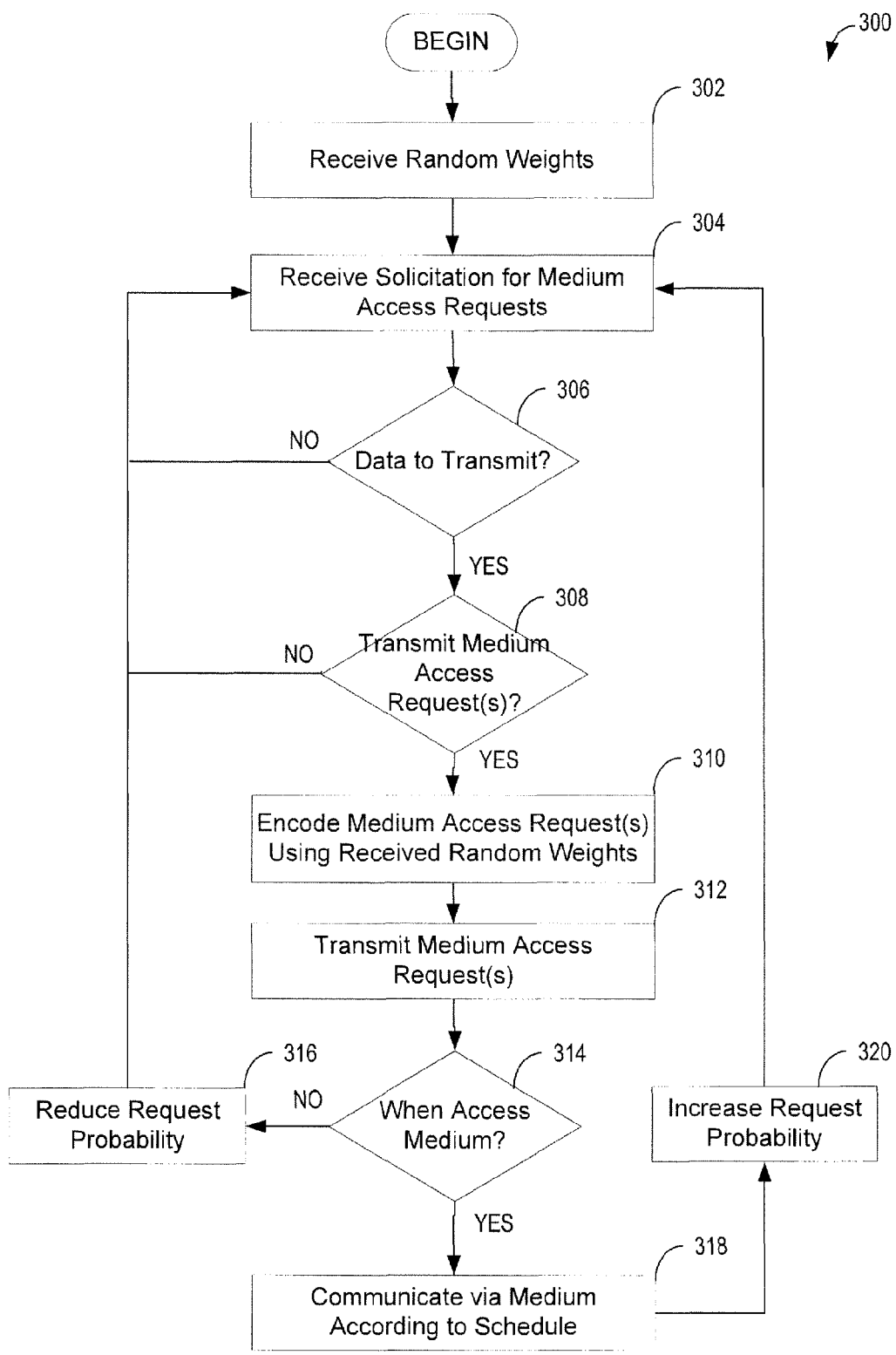
FIG. 3 is a flowchart of an illustrative process, performed by a computing device sharing a physical communication medium with one or more other computing devices, for accessing the shared medium in accordance with a compressive sensing medium access control technique, in accordance with some embodiments.

A computing device sharing a communication medium with one or more other computing devices may perform acts in accordance with a CS-MAC technique to access the medium in order to transmit and/or receive data from another computing device or devices via the medium. Examples of such acts are illustrated in FIG. 3, which is a flowchart of an illustrative process 300 performed by a computing device in accordance with a CS-MAC technique. Process 300 may be performed by any suitable computing device such as a wireless station in a wireless local area network or any other suitable computing device. It should be appreciated that process 300 may be performed by multiple computing devices sharing a communication medium.

Process 300 begins at act 302, where the computing device executing process 300 obtains a plurality of random weights to be used in encoding medium access requests generated by the computing device. The random weights may be obtained in any suitable way and, for example, may be generated by the computing device, accessed by the computing device, and/or provided to the computing device. For example, in some embodiments, the random weights may be received from a controller device configured to coordinate medium access among multiple computing devices that share the medium. In other embodiments, the computing device may receive the random weights from other computing devices, obtain the random weights from at least one non-transitory storage medium (e.g., at least one physical memory), and/or generate the random weights by executing one or more functions for generating the weights, as aspects of the disclosure provided herein are not limited to a single technique of obtaining the random weights.

The number of random weights obtained by a computing device may depend on the number of random weights to be used in encoding one or multiple medium access requests. In some embodiments, the computing device may obtain sufficiently many random weights needed to encode one medium access request. As an illustrative non-limiting example, a random weight may be obtained for each of one or more portions (e.g., bits, bytes, or any other suitable size portion) of a medium access request to be encoded by the computing device. In some embodiments, when a computing device may encode multiple medium access requests, the computing device may obtain a different set of random weights for at least some (e.g., at least two, at least three, all, etc.) of the medium access requests. Though, in other embodiments, the same set of random weights may be used to encode each medium access request, as aspects of the disclosure provided herein are not limited in this respect.

The random weights may take on any suitable values. For example, the value of a random weight may be −1, 0, or 1. As another example, the value of a random weight may be any real number between −1 and 1. As yet another example, the value of a generated weight may be any real number. The random weights may be generated (by the computing device executing process 300 or, prior to the computing device obtaining the random weights at act 302, by any other computing device) according to one or more probability distributions. For example, one or more random weights may be generated according to a distribution of at least one Bernoulli random variable (biased or unbiased). As another example, one or more weights may be generated according to a distribution of at least Gaussian random variable. Though, it should be appreciated that weights may be generated according to any of numerous other types of distributions (e.g., log-Normal distribution, exponential distribution, uniform distribution, truncated Gaussian distribution, etc.) or in any other suitable way, as aspects of the present invention are not limited in this respect.

After random weights are obtained at act 302, process 300 proceeds to act 304, where a solicitation for medium access requests is received by the computing device executing process 300. As described with reference to FIG. 4 below, the solicitation may be transmitted by a controller device (or another device communicatively coupled to the controller device) configured to coordinate, among devices sharing a communication medium, access to the shared medium. In some embodiments, the solicitation may be received via the shared medium. As an illustrative non-limiting example, a wireless station sharing a wireless network (e.g., wireless network 101) with other wireless stations may receive a solicitation for medium access requests, via the wireless network, from an access point in the wireless network (or another device communicatively coupled to the access point). It should be appreciated that the solicitation may be received concurrently by multiple devices sharing a communication medium.

The solicitation for medium access requests may comprise any suitable information indicating how computing devices may request access to the communication medium they share. For example, in some embodiments, the solicitation may specify a time period during which computing devices may transmit medium access requests to the controller device and/or any other suitable device. Since multiple computing devices may transmit medium access requests during the specified time period, such time periods are sometimes called "contention periods" or "contention windows." A solicitation for medium access requests is not limited to only specifying time periods during which medium access requests may be transmitted and may contain any other suitable information for indicating how computing devices may request access to the communication medium they share. For example, the solicitation may comprise information indicating where computing devices should transmit medium access requests or any other suitable information.

In some embodiments, the solicitation for medium access requests may indicate multiple time periods during which computing devices may transmit medium access requests to the controller device and/or any other suitable device. The solicitation may indicate any suitable number of time periods, as aspects of the disclosure provided herein are not limited in this respect. In some embodiments, the number of time periods may depend on the number of computing devices expected to transmit a medium access request. For example, the number of time periods specified may be greater than or equal to the number of computing devices expected to transmit a medium access request. As one illustrative non-limiting example, suppose that N computing devices share a communication medium and that K of the N computing devices are expected to transmit a medium access request. In this case, the solicitation for medium access requests may specify at least K time periods (e.g., at least 2K time periods, at least 4K time periods, at least 5K time periods, at least 10K time periods, at least 15K time periods, at least 20K time periods, etc.). When a solicitation for medium access requests specifies multiple time periods, the specified time periods may be regularly spaced, but aspects of the disclosure provided herein are not limited in this respect. Techniques for determining the number of computing devices expected to transmit a medium access request are described in greater detail below.

Responsive to receiving a solicitation for medium access requests, process 300 proceeds to decision block 306, where it is determined whether the computing device executing process 300 has data to transmit. This determination may be made in any suitable way, as aspects of the disclosure provided herein are not limited in this respect. As one illustrative non-limiting example, an application program and/or an operating executing on the computing device may provide an indication (e.g., via a function call or in any other suitable way) that it has data to transmit.

When it is determined, in decision block 306, that the computing device executing process 300 has no data to transmit, process 300 proceeds to act 304 and waits for receipt of another solicitation for medium access requests. On the other hand, when it is determined in decision block 306, that the computing device has data to transmit, process 300 proceeds to decision block 308, where it is determined whether the computing device will transmit at least one medium access request.

In some embodiments, it may be advantageous to limit the number of computing devices concurrently sending medium access requests even if more computing devices would send medium access requests in absence of such a limitation. Indeed, it may be the case that all computing devices sharing a communication medium wish to transmit data and would concurrently transmit medium access requests in absence of such limitation. In some embodiments, compressive-sending MAC techniques may be implemented more efficiently when the number of devices concurrently transmitting medium access requests is limited. As one illustrative non-limiting example, when the number of time periods in a solicitation for medium access requests is greater than or equal to the number of computing devices expected to transmit a medium access request, limiting the number of computing devices expected to transmit a medium access request may reduce the number of time periods in a solicitation and, consequently, the number of times each computing device may transmit a medium access request.

In some embodiments, as illustrated in process 300, the number of computing devices concurrently transmitting or expected to transmit a medium access request may be limited by each device making a local decision (e.g., at decision block 308) as to whether to transmit at least one medium access request. A computing device may determine whether to transmit a medium access request in any suitable way. For example, in some embodiments, the computing device may determine whether to transmit a medium access request using a probabilistic approach. For example, the computing device may make the determination to transmit a medium access request with probability p and may make the determination not to transmit a medium access request with probability 1−p. The probability p may be any suitable value between 0 and 1 (inclusive) and may be obtained in any suitable way. For example, the probability p may be provided by a controller device. This may allow the controller device to control the expected number of computing devices concurrently transmitting a medium access request. As an illustrative non-limiting example, if each of N computing devices were to send a medium request with probability p, then the expected number of computing devices concurrently transmitting a medium access request will be K=Np. Additionally or alternatively, the probability p may be set and/or adjusted by the computing device executing process 300 (e.g., as described with reference to e to acts 316 and 320 below). It should be appreciated that a computing device may use any approach other than a probabilistic approach to determine whether to transmit a medium access request at act 308, as aspects of the disclosure provided herein are not limited in this respect.

When it is determined that a computing device is not to transmit a medium access request, process 300 proceeds to act 304 and waits for receipt of another solicitation for medium access requests. On the other hand, when it is determined in decision block 308, that the computing device is to transmit a medium access request, process 300 proceeds to act 310, where the computing device executing process 300 encodes at least one medium access request.

A medium access request may comprise any suitable information indicating that the computing device desires access the shared communication medium. As one illustrative non-limiting example, a medium access request may comprise information indicating an amount of data the computing device has to transmit and/or an amount of time the computing device needs to transmit the data. As another non-limiting illustrative example, a medium access request may comprise information indicating the type of data the device has transmitted (e.g., data related to a function performed by an application program, an operating system, etc.). A medium access request may comprise any other information such as information identifying the computing device transmitting the medium access request, information identifying the device or devices (e.g., a controller device) to which the medium access request is being transmitted, and/or any other suitable data, as aspects of the disclosure provided herein are not limited by the type and/or amount of data that a medium access request may contain.

A computing device may encode at least one medium access request by using a compressive sensing encoding technique. For example, in some embodiments, the computing device may encode a medium access request using the random weights received at act 302. This may be done in any suitable way. As one illustrative non-limiting example, the random weights may be used to multiply bits in the medium access request to obtain an encoded medium access request. Random weights may be used to multiply some or all bits in the medium access request. Though, it should be appreciated that multiplying bits in a medium access request is an example of a compressive sensing encoding technique and that a medium access request may be encoded in any other suitable way.

In some embodiments, a computing device may encode multiple medium access requests. For example, the computing device may encode a medium access request for transmission in each of one or more multiple time periods specified by the solicitation for medium access requests. In some embodiments, the computing device may encode the same medium access request using different encodings to produce different encoded medium access requests for transmission in each of one or more multiple time periods specified by the solicitation. As an illustrative non-limiting example, the solicitation may specify M time periods, where M is any positive integer greater than or equal to two, and the computing device may encode the same medium access request M times, using a different encoding for at least two (e.g., all) of the M times. This may be done in any suitable way. For example, the computing device may encode the medium access request using one set of random weights to obtain a first encoded medium access request and may encode the same medium access request using a different set of random weights (e.g., at least one different random weight is used) to obtain a second encoded medium access request. As another example, the computing device may encode the same medium access request M times using M different sets of random weights.

Next, process 300 proceeds to act 312, where the one or more encoded medium access requests (encoded in act 310) are transmitted. The encoded medium access request(s) may be transmitted to any suitable device and, for example, may be transmitted to the controller device and/or any other device communicatively coupled to to the controller device. The encoded medium access request(s) may be transmitted during the time period(s) specified in the solicitation for medium access requests. When the solicitation specifies multiple periods for transmitting medium access requests, the computing device may transmit encoded medium access requests in each of one or more (e.g., all) specified time periods.

As previously mentioned, since multiple computing devices may be each executing process 300 concurrently, the devices may concurrently transmit the encoded medium access requests. The devices may be configured to transmit medium access requests in a way that promotes synchronization among the transmitted requests. In some embodiments, the devices may be configured to concurrently transmit encoded medium access requests such that their transmission is synchronized at the symbol level. This may be done in any suitable way and, for example, may be achieved by setting the length of each symbol to increase the likelihood that the transmissions are synchronized at the symbol level. As an illustrative non-limiting example, assuming a 300-meter radio range between the computing devices transmitting the encoded medium access requests and the controller device receiving such request, timing misalignments between transmitted symbols may be limited by 2 microseconds. To overcome a 2-microsecond misalignment, the symbol length may be extended by 2 microseconds to ensure two concurrently transmitted symbols will overlap. The individual symbols may be then decoded from this overlapped interval of the symbols.

Next, process 300 proceeds to decision 314, where it is determined when, if at all, the computing device executing process 300 may access the communication medium to transmit and/or receive data via the medium. Such a determination may be made in any suitable way and, for example, may be made based on information received responsive to transmitting at least one encoded medium access request at act 312. For example, when the computing device receives information indicating that the encoded medium access request was not successfully processed (e.g., not successfully transmitted, not successfully received, not successful decoded, etc.) and/or any other suitable information indicating that the computing device may not obtain access to the communication medium, it may be determined that the computing device may not access the communication medium to transmit and/or receive data via the medium. In this case, to process 300 proceeds to act 316, where the computing device may decrease the probability of transmitting (e.g., by multiplying the probability with a predetermined discount value between 0 and 1) subsequent medium access requests (thereby implementing any one of back-off schemes known in the art). After performing act 316, process 300 returns to act 304 and waits for receipt of another solicitation for medium access requests.

As another example, when the computing device receives information indicating one or more time periods for when to transmit and/or receive data via the medium, it may be determined that the computing device may access the communication medium and transmit and/or received data in accordance with the specified time period(s). Such information may be provided by the controller device (e.g., controller device 102), by another device communicatively coupled to the controller device, and/or by any other suitable source. The information indicating when the computing device may use the communication medium may comprise one or more time periods during which the computing device may transmit and/or receive data via the communication medium. The information may be in any suitable format, as aspects of the disclosure provided herein are not limited in this respect. As one illustrative non-limiting example, the information may be in the form of a schedule indicating when each of multiple computing devices (e.g., the computing devices requesting access to the shared medium) may access the medium to transmit data. The schedule may be a conflict-free schedule constructed in such a way that, if the devices were to transmit data according to the schedule, only one device at a time would be transmitting data.

When it is determined, at decision block 314, that the computing device is to transmit and/or receive data via the communication medium, process 300 proceeds to act 318, where the computing device transmits and/or receives data via the communication medium. As previously mentioned such a determination may be made in response to receiving information indicating one or more time periods for when to transmit and/or receive data via the medium. The computing device may transmit and/or receive data during these time period(s) at act 318.

Next, process 300 proceeds to act 320, where the computing device may increase the probability of transmitting (e.g., by adding a small predetermined value to the probability) subsequent medium access requests. After performing act 320, process 300 returns to act 304 and waits for receipt of another solicitation for medium access requests.

Figure 4:
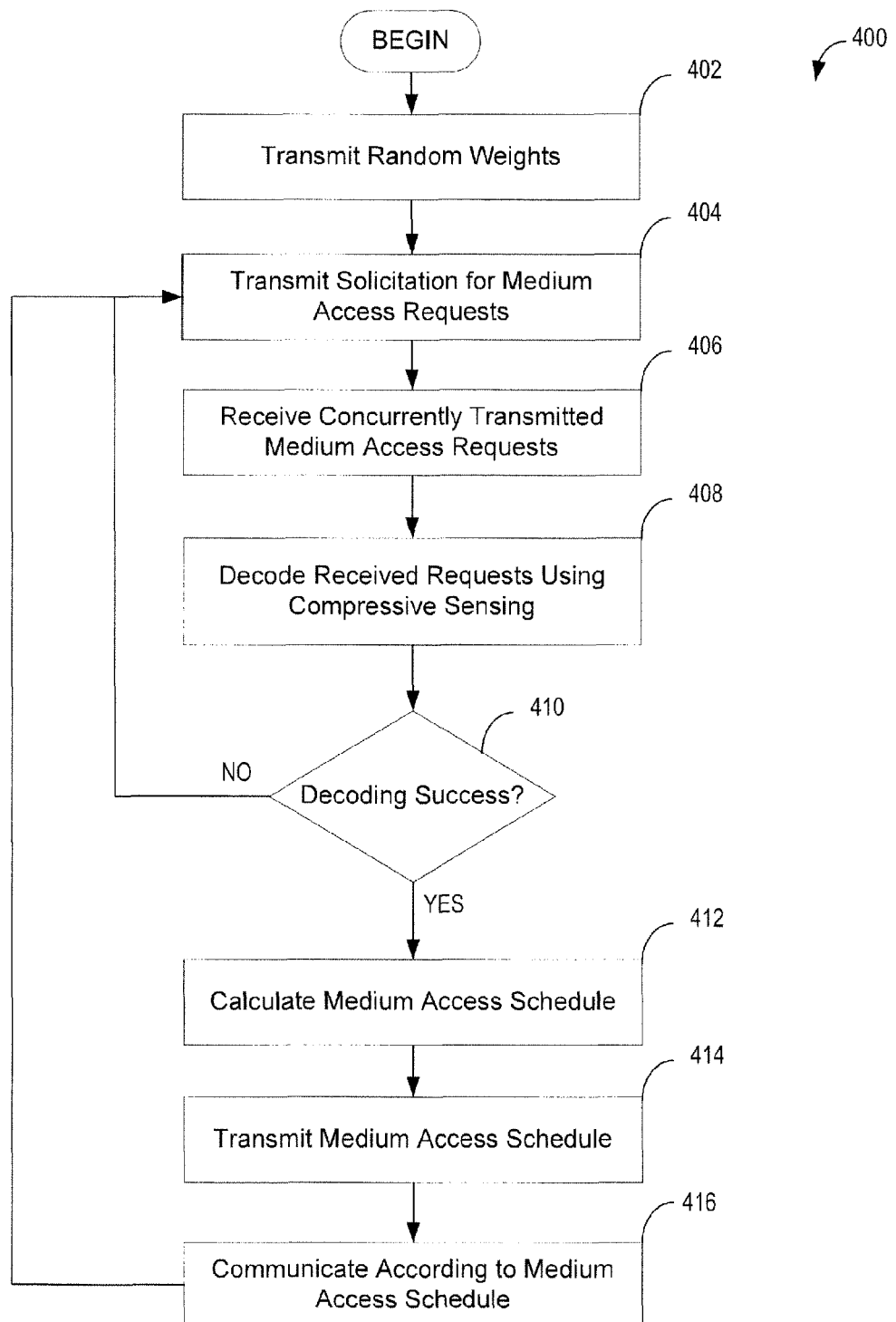
FIG. 4 is a flowchart of an illustrative process, performed by a controller device, for coordinating medium access among multiple computing devices sharing a physical communication medium in accordance with a compressive sensing medium access control technique, in accordance with some embodiments.

A controller device configured to coordinate, among multiple computing devices sharing a communication medium, access to the medium may perform acts in accordance with a CS-MAC technique. Examples of such acts are illustrated in FIG. 4, which is a flowchart of an illustrative process 400 performed by a controller device in accordance with a CS-MAC technique. Process 400 may be performed by any suitable controller device such as an access point in a wireless local area network and/or any other suitable type of controller device.

Process 400 begins at act 402, where the controller device transmits random weights to one or more computing devices sharing a communication medium. The random weights may be broadcast to any devices (or subset of devices) configured to receive communications from the controller device. Though, the random weights may be transmitted in any other suitable way, as aspects of the disclosure described herein are not limited in this respect. Any suitable types of random weights may be transmitted, examples of which were previously described with reference to act 302 of process 300.

As previously mentioned, in some embodiments, computing devices may obtain random weights in ways other than receiving them from a controller device. For example, the computing devices may generate the random weights or receive them from a source other than the controller device. In such embodiments, instead of transmitting random weights to computing devices, at act 402, the controller device may obtain (e.g., access, receive, or otherwise look up) random weights being used by computing devices. For example, in some embodiments, the controller device may look up random weights used by a computing device (e.g., to encode at least one medium access request) based at least in part on information identifying the computing device. Information identifying the computing device may be its link-layer address, physical-layer address, and/or any other suitable identification information, as aspects of the disclosure provided herein are not limited in this respect.

Next process 400 proceeds to act 404, where the controller device transmits a solicitation for medium access requests to one or more computing devices sharing a communication medium. The solicitation for medium access requests may comprise any suitable information, examples of which have been described with reference to act 304 of process 300.

Next process 400 proceeds to act 406, where encoded medium access requests transmitted by one or multiple computing devices are received. The encoded medium access requests may be transmitted by the computing devices in response to the solicitation for medium access requests. As previously described, any suitable number of computing devices may transmit medium access requests, however, in some embodiments the number of computing devices concurrently transmitting medium access requests may be limited. Accordingly, in some embodiments, encoded medium access requests may be received from K computing devices out of N computing devices configured to communicate with the controller device executing process 400, where K and N are positive integers and K<N. In some embodiments, K is an integer smaller than N/c, where c is any constant (e.g., c>2, c>3, c>5, c>10, c>20, c>25, c>50, etc.).

As previously described, in some embodiments, a solicitation for medium access requests may specify multiple time periods (e.g., M>1, where M is a positive integer) for sending medium access requests. Accordingly, at act 406, controller device may receive encoded medium access requests from one or more computing devices in each of multiple time periods specified in the solicitation for medium access requests. In some embodiments, encoded medium access requests may be received from the same group of computing devices in each of the multiple time periods specified in the solicitation for medium access requests.

In some embodiments, when multiple computing devices concurrently transmit respective encoded medium access requests, the controller device may receive a single medium access request signal formed at least in part by a superposition of the concurrently transmitted encoded medium access requests. The encoded medium access request signal may be formed further based on characteristics of the channel including, but not limited to, channel noise.

As an illustrative non-limiting example, when N computing devices encode medium access requests $x_1, x_2, \ldots, x_N$, each consisting of 1 bit, by using random weights $a_1, a_2, \ldots, a_N$ and concurrently transmit the resulting encoded medium access requests via the communication medium, the controller device may receive a medium access request signal y according to:

$$y = [\begin{array}{cccc} a_1 & a_2 & \ldots & a_N \end{array}] \begin{bmatrix} h_1 x_1 \\ h_2 x_2 \\ \vdots \\ h_N x_N \end{bmatrix} + n$$

where, for each $1 \leq i \leq N$, $a_i$ is an M×1 vector of random weights used by the i'th computing device to encode the medium access request $x_i$ M times (e.g., by multiplying $x_i$ by the elements of the vector $a_i$), where $h_i$ is a scalar value representing channel characteristics for every $1 \leq i \leq N$, and where n is an M×1 vector representing additive noise in the communication medium. In this example, the received encoded medium access request signal is an M×1 vector y, each row of which contains a value obtained at least in part as a superposition of N 1-bit encoded medium access requests concurrently transmitted by N computing devices sharing a communication medium. The value in the m'th row of the vector y is obtained based at least in part on a superposition of N 1-bit encoded medium access requests concurrently transmitted by the N devices in the m'th of M time periods specified in the solicitation for medium access requests.

It should be appreciated that medium access requests are not limited to consisting only of one bit and, in some embodiments, one or more of the medium access requests may comprise any suitable number of bits. For example, if the i'th computing device were to encode a medium access request consisting of B bits, then the above equation may be modified by replacing the scalar $x_i$ with the 1×B vector $x_i$, the scalar $h_i$ with an appropriate matrix $H_i$ representing channel characteristics, and the M×1 vector $a_i$, with an M×B matrix $A_i$ of random weights used for encoding the B-bit medium access request. Accordingly, y may comprise B bits for the i'th computing device. As another example, if each of N computing devices were to encode a medium access request consisting of B bits, the controller device would receive a medium access request signal represented by an M×B matrix Y, where each row would be obtained based, at least in part, on a superposition of N B-bit encoded medium access requests concurrently transmitted by the N devices sharing a communication medium. The values in the m'th row of the matrix Y would be obtained based, at least in part, on a superposition of N B-bit encoded medium access requests concurrently transmitted by the N devices in the m'th of M time periods specified in the solicitation for medium access requests.

It should also be appreciated that although, in the above example, N computing devices concurrently transmit encoded medium access requests, aspects of the disclosure provided herein are not limited in this respect. As previously described, in some embodiments, some but not all computing devices may concurrently transmit medium access requests (e.g., K out of N computing devices may transmit medium access requests, where K and N are integers and K is smaller than N). The above equation may be adapted to such a case by setting to 0 the bits corresponding to any medium access request for a computing device that did not transmit a medium access request. For example, if the computing device j did not send a medium access request, $x_j$ may be set to the 0 vector.

After the medium access request signal, formed at least in part by a superposition of multiple encoded medium access requests, is received at act 406, process 400 proceeds to act 408, where the received medium access request signal is decoded to obtain decoded medium access requests corresponding to the concurrently transmitted medium access requests. The decoding may be performed in any suitable way and, in some embodiments, the decoding may be performed, at least in part, by using a compressive sensing decoding technique.

Some compressive sensing decoding techniques are based on the assumption that signals may be sparse in some sparsifying domain, (i.e., a signal may be represented by a few significant coefficients in the sparsifying domain). As one non-limiting example, some images may be represented by a small number of coefficients in the Discrete Cosine Transform (DCT) domain. As another non-limiting example, some one-dimensional signals may be represented by a small number of significant coefficients in a wavelet domain. Accordingly, some compressive sensing decoding techniques attempt to identify an unknown signal assumed to be sparse in a sparsifying domain from a small number of measurements of that signal at least in part by applying a sparsity constraint specified with respect to the sparsifying domain. Since a small number of measurements of a signal generally do not uniquely identify the signal, the sparsity constraint may help to accurately identify the signal with high probability.

The inventors have recognized and appreciated that when the received medium access request signal is formed at least in part as a superposition of a small number (e.g., K<N) concurrently transmitted encoded medium access requests, a compressive sensing decoding technique may be used to decode the received signal to recover each of the concurrently transmitted medium access requests. It should be appreciated, however, that in some embodiments, the decoding is performed without the knowledge of the exact number of encoded medium access requests that were concurrently transmitted in response to the solicitation for medium access requests. For example, when each one of N computing devices is configured to transmit an encoded medium access request with probability p, the expected number of concurrently transmitted medium access requests is given by pN, but the actual number of concurrently transmitted requests may differ from pN (e.g., because of variance in the probabilistic process of determining which devices will send a medium access request, because fewer than N computing devices may have data to transmit, and/or for any other suitable reasons).

Accordingly, in some embodiments, a compressive sensing decoding technique may be applied to the received medium access request signal to obtain decoded medium access requests. Any suitable compressive sensing decoding technique may be applied. In some embodiments, applying a compressive sensing decoding technique to the received medium access request signal comprises using the random weights, which were used to encode the medium access requests, to perform the decoding. For example, applying the compressive sensing decoding technique to the received medium access request signal may comprise solving for the medium access requests $x_1, \ldots, x_N$ from the received signal y by using a system equations in which the random weights to relate the received signal y to the unencoded medium access the requests $x_1, \ldots, x_N$.

A system of equations relating the received medium access signal y to the unencoded medium may be used to decode the received medium access signal in any suitable way. In some embodiments, the system of equations may be solved to obtain medium access requests $x_1, \ldots, x_N$ subject to a sparsity constraint (e.g., an $l_1$ constraint) on the medium access requests penalizing solutions having a large number of non-zero medium access requests. In other words, a sparsity constraint would favor those solutions to the system of equations in which only a small number of medium access requests are non-zero. In some embodiments, the system of equations may be used as an equality constraint in an optimization problem in which the objective function is the $l_1$ norm (e.g., sum of absolute values) of the medium access requests.

As a specific non-limiting example of using the above-described system of equations to decode the received medium access request signal, assume that an unknown number of computing devices (out of N total computing devices, where N is a positive integer greater than 1) encode medium access requests each consisting of 1 bit and concurrently transmit the encoded medium access requests via a shared communication medium. Each computing device encodes and transmits the respective medium access requests in each of M time periods specified in the solicitation for medium access requests. The controller device may then receive an M×1 vector y comprising a bit for each of the M time periods. Each bit for a time period is obtained based at least in part on a superposition of an unknown number of 1-bit encoded medium access requests concurrently transmitted in that time period. Let the vector x be an N×1 vector to be identified by a compressive sensing decoding technique by solving $$\min_{x \in \mathbb{R}^N} |x|_{\ell_1} \text{ subject to } y = Ax$$

where the M×N matrix $A=[a_2, a_2, \ldots, a_N]$, where, for each $1 \le i \le N$, $a_i$ is an M×1 vector of random weights used by the i'th computing device to encode the medium access request $x_i$ M times (e.g., by multiplying x, by the m'th element of the vector a; to encode the access request in the m'th time period). The above optimization problem comprises an objective function (i.e., minimizing the $l_1$ norm of x) and multiple equality constraints y=Ax. The system of equations y=Ax relates the received signal y to the unencoded medium access the requests $x_1, \ldots, x_N$. It is well known that minimizing the above objective function favors sparse solutions among those solutions which are consistent with the measurements y and the system of equations y=Ax. In the solution to the above-formulated optimization problem a "1" in the i'th spot indicates that the i'th computing device transmitted an encoded medium access request.

When the signal y was obtained by K concurrent transmissions (note the value K is not used by the compressive sensing decoding technique), results about properties of compressive sensing decoding techniques known in the art indicate that the solution of the above-formulated optimization problem may, with high probability, have K non-zero values (corresponding to the K transmitted medium access requests). For example, when K<N and M is greater than or equal to cK (with c greater than or equal to three), the solution of the above-formulated optimization problem may, with high probability, accurately obtain a solution x having K non-zero values.

As previously described, medium access requests are not limited to consisting only of one bit and, in some embodiments, one or more of the medium access requests may comprise any suitable number of bits. When medium access requests comprise more than one bit, a compressive sensing decoding technique may be applied to the received signal to decode the received signal one bit at a time. As an illustrative non-limiting example, when each of the medium access requests consists of B bits (where B is any positive integer greater than 1), the controller device executing process 400 may receive the signal y comprising M×B bits (e.g., B bits for each of M time periods specified in the solicitation). The above-described optimization problem may be solved B times (using M bits each time) to decode the medium access requests one bit at a time. In some embodiments, when medium access requests are being decoded one bit a time, a decoder may use already decoded bits to help decode other bits (e.g., by incorporating one or more constraints across bits into an optimization problem being solved by the compressive sensing decoding technique). For example, the decoded values for the i'th bit in a medium access request may be used to help decode bits i+1 . . . B in that medium access request. Though, it should be appreciated that compressive sensing decoding techniques are not limited to decoding medium access requests one bit at a time and, in some embodiments, may be used to decode multiple or all bits at a time. This may be done in any suitable way and, for example, may be done with a suitable modification of the above-described optimization problem to solve for multiple bits at a time based on the received medium access request signal.

As previously described, the received medium access request signal may be formed via a superposition of concurrently transmitted encoded medium access requests transmitted through the shared communication medium. Characteristics of the medium may affect the received medium access request signal, for example, by modifying one or more values in the transmitted requests. As is well known, such modifications may be accurately modeled as multiplicative modifications (e.g., amplitude modulations). For example, one or more bits in an encoded medium access request may be multiplied by a to real number representing characteristics of a transmission channel.

In some embodiments, a compressive sensing decoding technique may take the effect of such modifications into account to decode the medium access requests. This may be done in any suitable way. As one illustrative non-limiting example, channel characteristics may be estimated off-line and subsequently used as part of the decoding of the medium access requests. As another illustrative non-limiting example, a decoding process may estimate the value $h_i x_i$ instead of the value $x_i$ in the medium access request, where $h_i$ is a real number modeling channel effects on the value $x_i$. When $x_i$ takes on the values 0 or 1, then $h_i x_i$ takes on the values 0 or $h_i$. Accordingly, in some embodiments, a threshold may be used to distinguish between the situations when $x_i$ is zero or non-zero. Still other techniques for taking channel characteristics into account may be used, as aspects of the disclosure provided herein are not limited in this respect.

The above-described optimization problem and variants thereof may be solved in any suitable way. For example, in some embodiments, the above-described optimization problem may be solved using any suitable linear programming technique(s). To this end, one or more software packages implementing these linear programming techniques may be utilized. For example, in some embodiments, compressive sensing decoding module 214 may use linear programming techniques provided by one or more compressive sensing software packages, numerical linear algebra software packages, and/or any other suitable software. It should be appreciated that the above-described optimization problem may be parallelized and, as such, may be solved at least in part by one or more processors and/or one or more graphical processing units.

It should also be appreciated that the above-described optimization problem is an illustrative example of how a compressive sensing decoding technique may be applied and that applying a compressive sensing decoding technique may comprise solving a different optimization problem or problems, as aspects of the disclosure provided herein are not limited in this respect.

After the received medium access request signal is decoded in act 408, process 400 proceeds to decision block 410, where it is determined whether the medium access requests were decoded successfully. In some instances, the encoded medium access requests may not be successfully decoded if there were not sufficiently many medium access requests transmitted by each of the computing devices (e.g., the number of time periods M specified in the solicitation was not sufficiently large given the number of computing devices concurrently transmitting medium access requests). This determination may be made in any suitable way. As one illustrative non-limiting example, the determination may be made by analyzing the results of the decoding process to determine whether they are consistent with the format of medium access requests. As another example, the result may indicate that the decoder identified that a larger than expected proportion of medium access requests were decoded, which in turn may imply that the decoding result is incorrect for if that many medium access requests were actually sent, the probability that the compressive sensing decoding technique would accurately decode them is below a threshold.

Regardless of the way in which the determination of successful decoding is made, in response to determining in decision block 410 that the received medium access signal was not successfully decoded, process 400 may transmit a message to one or more of the computing devices indicating that the previously transmitted medium access requests were not successfully decoded, and may return, via the NO branch, to act 404.

On the other hand, in response to determining in decision block 410 that the received medium access signal was successfully decoded, process 400 proceeds to act 412, where it is determined, based at least in part on the plurality of decoded medium access requests, when each of computing devices in the subset is to transmit data to the controller device. This determination may be made in any suitable way, as aspects of the disclosure provided herein are not limited in this respect.

In some embodiments, a schedule comprising information identifying when each computing device requesting access to the shared communication medium may transmit and/or receive data via the medium may be constructed as part of act 412. The schedule may specify one or more time periods for each of one or more devices, which transmitted medium access requests, indicating when each of the one or more devices may access the medium. In some instances, the schedule may specify that some, but not all, of the devices that transmitted medium access requests may access the medium. In some embodiments, the schedule may specify that the computing devices access the medium one at a time. Accordingly, in such embodiments, the schedule may specify at least one time period during which one computing device may transmit and/or receive data via the communication medium such that the at least one time period does not overlap with any other time period during which another computing device (excluding the controller device) may transmit and/or receive data via the medium. The schedule may be in any suitable format, as aspects of the disclosure provided herein are not limited in this respect.

Next, process 400 proceeds to act 414, where the schedule comprising information identifying when each computing device may transmit and/or receive data via the medium is transmitted to the computing devices. Next process 400 proceeds to act 416, where the controller device executing process 400 may communicate with each of the computing devices in accordance with the transmitted schedule. For example, the controller device may receive data transmitted by a computing device during at least one time period allocated for that computing device in the transmitted schedule. As another example, the controller device may transmit data to a computing device during at least one time period allocated for that computing device in the transmitted schedule.

After all of the device have communicated with the controller device in accordance with the transmitted schedule, process 400 returns to act 404, where another solicitation for medium access requests may be sent.

As used herein, the transmission of two or more medium access requests (or more generally any two signals) is concurrent if the requests have any overlap in time as they are being transmitted. The transmission of two or more medium access requests is substantially concurrent if overlapping in time by at least 80%, by at least 90%, or more. The transmission of two medium access requests is substantially simultaneous if overlapping in time by approximately 95% or more.

Having thus described several aspects and embodiments of the technology described in the application, it is to be appreciated that various alterations, modifications, and improvements will readily occur to those skilled in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described to herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present application involving the performance of methods may utilize program instructions executable by a device (e.g., a computer, a processor, or other device) to perform, or control performance of, the methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments discussed above. The computer readable medium or media can be transportable, such that the program or programs stored thereon can be loaded onto one or more different computers or other processors to implement various ones of the aspects discussed above. In some embodiments, computer readable media may be non-transitory media.

The terms "program" or "software" are used herein in a generic sense to refer to any type of computer code or set of computer-executable instructions that can be employed to program a computer or other processor to implement various aspects as discussed above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Figure 5:
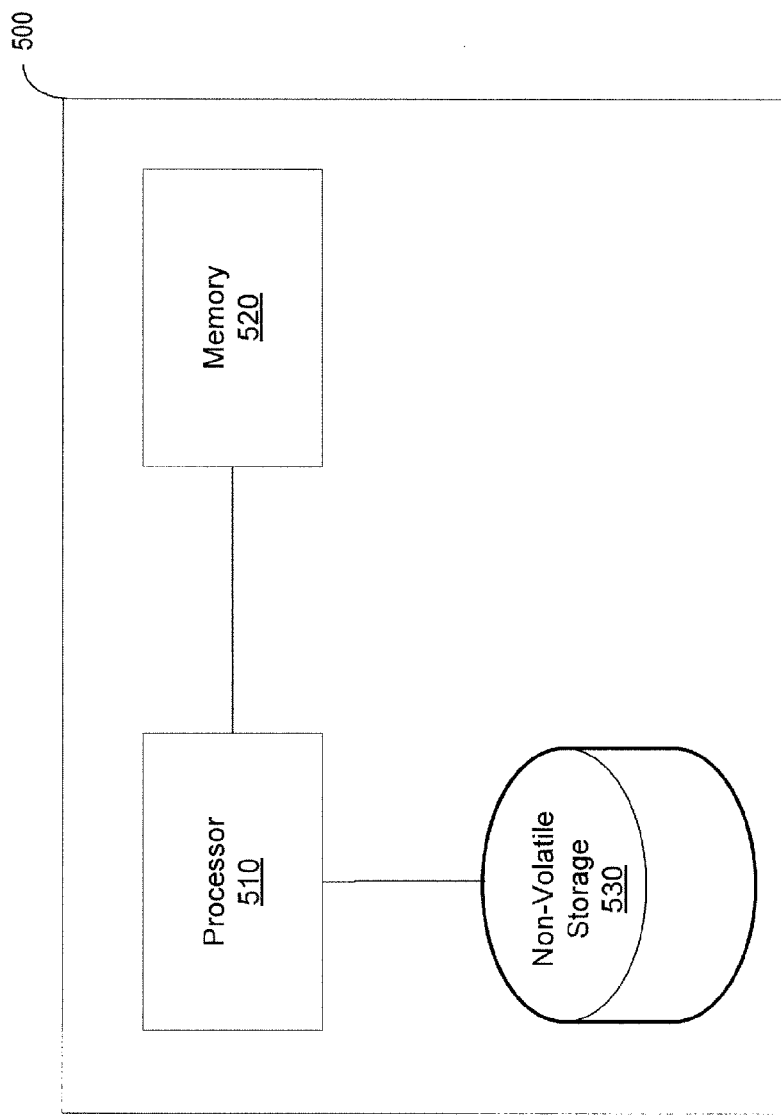
FIG. 5 shows an illustrative implementation of a computer system that may be used in connection with some embodiments.

A computer system that may be used in connection with any of the embodiments of the invention described herein is shown in FIG. 5 such as, but not limited to, computing devices 102, 106a, 106b, and 106c. The computer system may include one or more processors 510 and one or more non-transitory computer-readable storage media (e.g., memory 520 and one or more non-volatile storage media 530). The processor 510 may control writing data to and reading data from the memory 520 and the non-volatile storage device 530 in any suitable manner, as the aspects of the invention described herein are not limited in this respect. To perform any of the functionality described herein, the processor 510 may execute one or more instructions stored in one or more computer-readable storage media (e.g., the memory 520), which may serve as non-transitory computer-readable storage media storing instructions for execution by the processor 510.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as discussed, some aspects may be embodied as one or more methods including, but not limited to, any method including steps described with reference to illustrative processes 300 and 400 and FIGS. 3 and 4. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method, performed by a first computing device configured to communicate with a second computing device, the method comprising:
   (A) receiving a solicitation for at least a first medium access request that specifies at least one time period for transmitting the first medium access request to the second computing device;
   (B) encoding the first medium access request at least in part by using a compressive sensing encoding technique to obtain a first encoded medium access request, wherein using the compressive sensing encoding technique comprises modifying bits in the first medium access request by using a first plurality of random weights; and (C) transmitting the first encoded medium access request to the second computing device during the at least one time period specified in the received solicitation.

2. The method of claim 1, further comprising:
(D) in response to (C), receiving information indicating when the first computing device is to transmit data to the second computing device.

3. The method of claim 1, wherein the modifying comprises multiplying bits in the first medium access request by the first plurality of random weights.

4. The method of claim 1, wherein weights in the plurality of random weights were obtained by using at least one probability distribution, wherein the at least one probability distribution comprises a probability distribution of a Bernoulli random variable.

5. The method of claim 1, further comprising:
(E) receiving the first plurality of random weights from the second computing device.

6. The method of claim 1, further comprising:
(F) in response to receiving the solicitation, determining whether to transmit the first medium access request to the second computing device; and when it is determined that the first medium access request is to be transmitted, performing (B) and (C).

7. The method of claim 1, further comprising:
(G) in response to (C), receiving information indicating that the second computing device could not decode the transmitted encoded medium access request.

8. A method, performed by a controller device configured to communicate with a plurality of computing devices, the method comprising:
(A) receiving a medium access request signal formed at least in part by a superposition of a plurality of encoded medium access requests transmitted by a subset of the plurality of computing devices, the plurality of encoded medium access requests comprising a first encoded medium access request obtained by modifying bits in a first medium access request by using random weights; and
(B) decoding the medium access request signal at least in part by using a compressive sensing decoding technique to obtain a plurality of decoded medium access requests, wherein using the compressive sensing decoding technique comprises using the random weights to decode the medium access request signal.

9. The method of claim 8, further comprising:
(C) determining, based at least in part on the plurality of decoded medium access requests, when each of computing devices in the subset is to transmit data to the controller device; and
(D) transmitting information to each one of the computing devices in the subset indicating when the one computing device is to transmit data to the controller device.

10. The method of claim 8, further comprising:
(E) transmitting, prior to performing (A), the random weights to the plurality of computing devices to be used for encoding medium access requests.

11. The method of claim 8, wherein the plurality of encoded medium access requests transmitted comprises at least M encoded medium requests from each of the computing devices in the subset, wherein M is an integer greater than 1.

12. A controller device configured to communicate with a plurality of computing devices, the controller device comprising:
at least one processor configured to perform:
(A) receiving a medium access request signal formed at least in part by a superposition of a plurality of encoded medium access requests transmitted by a subset of the plurality of computing devices, the plurality of encoded medium access requests comprising a first encoded medium access request obtained by modifying bits in a first medium access request by using random weights; and
(B) decoding the medium access request signal at least in part by using a compressive sensing decoding technique to obtain a plurality of decoded medium access requests, wherein using the compressive sensing decoding technique comprises using the random weights.

13. The controller device of claim 12, wherein the at least one processor is further configured to perform:
(C) determining, based at least in part on the plurality of decoded medium access requests, when each of computing devices in the subset is to transmit data to the controller device; and
(D) transmitting information to each one of the computing devices in the subset indicating when the one computing device is to transmit data to the controller device.

14. The controller device of claim 12, wherein the at least one processor is further configured to perform:
(E) transmitting, prior to performing (A), the random weights to the plurality of computing devices to be used for encoding medium access requests.

15. The controller device of claim 12, wherein the plurality of encoded medium access requests transmitted comprises at least M encoded medium requests from each of the computing devices in the subset, wherein M is an integer greater than 1.

16. The controller device of claim 15, wherein the subset of computing devices consists of K computing devices, wherein K is an integer greater than or equal to two, and wherein M is greater than or equal to K.

17. The controller device of claim 12, wherein the at least one processor is further configured to perform:
(F) transmitting a solicitation for medium access requests to the plurality of computing devices.

* * * * *